United States Patent
Pasini et al.

(10) Patent No.: US 8,798,263 B2
(45) Date of Patent: Aug. 5, 2014

(54) METHOD AND SYSTEM FOR ENCRYPTION WITH BIDIRECTIONAL DIFFERENCE PROPAGATION

(75) Inventors: Sylvain Pasini, Renens (CH); Jean-Philippe Aumasson, Vuibroye (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 79 days.

(21) Appl. No.: 13/423,695

(22) Filed: Mar. 19, 2012

(65) Prior Publication Data

US 2012/0250856 A1    Oct. 4, 2012

Related U.S. Application Data

(60) Provisional application No. 61/469,132, filed on Mar. 30, 2011.

(30) Foreign Application Priority Data

Mar. 30, 2011   (EP) ..................................... 11160483

(51) Int. Cl.
*H04K 1/04*    (2006.01)
*H04L 9/06*    (2006.01)

(52) U.S. Cl.
CPC ................ *H04L 9/0606* (2013.01); *H04L 9/06* (2013.01); *H04L 9/0675* (2013.01); *H04L 9/0637* (2013.01)
USPC .............................................. 380/37; 380/42

(58) Field of Classification Search
CPC ... H04L 9/0637; H04L 9/0625; H04L 9/0618; H04L 9/06; H04L 9/0687; H04L 9/18; H04L 9/0675; H04L 9/0606; H04L 9/08; H04L 9/0693

USPC ............................................ 380/37, 41, 42, 44
See application file for complete search history.

(56) References Cited

U.S. PATENT DOCUMENTS 5,799,089 A     8/1998  Kuhn et al.
8,321,675 B2 *  11/2012 Rogaway ....................... 713/170

(Continued)

OTHER PUBLICATIONS

Danezis, G. et al. "Minx: A Simple and Efficient Anonymous Packet Format", WPES'04, APM, pp. 59-65, Oct. 28, 2004, Washington, DC, USA.

(Continued)

*Primary Examiner* — Nirav B Patel
(74) *Attorney, Agent, or Firm* — Harness, Dickey & Pierce, P.L.C.

(57) ABSTRACT

An encryption method is disclosed, including two passes over a sequence of N input digital data $X_1, \ldots X_N$ blocks where the first pass executes iterative linear algebraic operations from the last input block $X_N$ to the first input block $X_1$ to obtain a sequence of intermediary resulting $Y_N \ldots Y_1$ blocks. The second pass executes a block ciphering in a chaining mode from the first intermediary resulting $Y_1$ block to the last one $Y_N$ to obtain a sequence of encrypted output $Z_1 \ldots Z_N$ blocks. The decryption is carried out only in one pass from the first input encrypted $Z_1$ block to the last input encrypted block $Z_N$. The deciphering operations are executed in an iterative loop of inverse linear algebraic operations after deciphering the first input encrypted $Z_1$ block to obtain an output sequence of decrypted $X_1, \ldots X_N$ blocks.

16 Claims, 4 Drawing Sheets

(56) References Cited

U.S. PATENT DOCUMENTS

2007/0237327 A1* 10/2007 Taylor et al. .................. 380/37
2009/0323932 A1    12/2009 Youn
2011/0026712 A1     2/2011 Ducharme et al.

OTHER PUBLICATIONS

Anderson, R. et al., "Two Practical and Provably Secure Block Ciphers: BEAR and LION", Fast Software Encryption, Third International Workshop, Lecture Notes in Computer Science, vol. 1039, pp. 113-120, 1996.

Canetti, R. et al., "Exposure-Resilient Functions and All-Or-Nothing Transforms", EUROCRYPT, vol. 1807 of LNCS, pp. 453-469, Springer, 2000.

Rivest, R. et al., "All-or-nothing encryption and the package transform" 4th International Workshop, Fast Software Encryption '97, Haifa, Isarael, Jan. 20-22, 1997, Proceedings, Lecture Notes in Computer Science, vol. 1267, Springer, 1997, pp. 210-218.

"Stack Processes for Increased Encryption Security", IBM Technical Disclosure Bulletin, International Business Machines Corp. (Thornwood), US, vol. 33, No. 10A, Mar. 1, 1991, p. 96/97, XP000109974, ISSN: 0018-8689 p. 96-p. 97 ; figure 1.

European Search Report, 2011.

* cited by examiner

METHOD AND SYSTEM FOR ENCRYPTION WITH BIDIRECTIONAL DIFFERENCE PROPAGATION

CROSS REFERENCE TO RELATED APPLICATIONS

This application claims priority under 35 U.S.C. Section 119 to U.S. Provisional Application No. 61/469,132, entitled "Method of encryption with bidirectional difference propagation" filed Mar. 30, 2011, and to European Patent Application EP11160483.1 entitled "Method of encryption with bidirectional difference propagation" filed Mar. 30, 2011, the contents of which are hereby incorporated by reference herein.

FIELD OF THE INVENTION

The invention relates to a method and a system adapted for encrypting and decrypting digital data divided into a plurality of blocks of a same length. The method may be applied on access controlled data packets of broadcast multimedia services in the filed of pay TV.

TECHNICAL BACKGROUND

A known method for encrypting a sequence of data blocks consists of a Cipher Block Chaining (CBC) process where each block of plaintext is combined with the preceding ciphertext block by using XOR operation before being encrypted. Each ciphertext block is thus dependent on all plaintext blocks processed before a given block.

The CBC method requires a decryption module with a buffer able to store at least two block lengths of digital data. Furthermore, a header block with a fixed bit pattern is generally provided at the beginning of each sequence or packet of digital data. As the first block is combined with a fixed initial vector, this could result in a bit pattern recognizable in the encrypted data.

The block cipher modes of operation with chaining provide error propagation in only one direction. A "folklore" method to obtain a Bidirectional Difference Propagation (BDP) is thus to make two processing passes over the data blocks, in the two directions (first block to the last, and reverse) as described in document of George Danezis and Ben Laurie, "Minx: a simple and efficient anonymous packet format", in Vijay Atluri, Paul F. Syverson, and Sabrina De Capitani di Vimercati, editors, WPES, pages 59-65. ACM, 2004. For both encryption and decryption, the whole sequence of blocks needs to be kept in memory, with two layers of encryption and decryption.

U.S. Pat. No. 5,799,089 discloses a system for encrypting and decrypting digital data wherein the data is divided in packets of N blocks $X_1 \ldots X_N$ of $2^m$ bits, comprises an encryption device and a decryption device. The encryption device reverses the input sequence of the blocks $X_1 \ldots X_N$ before a XOR operation and next an encryption operation by means of an encryption algorithm E is carried out on each block of a packet. Thereby the following encrypted blocks $Y_1 \ldots Y_N$ are formed: The encrypted blocks $Y_1 \ldots Y_N$ are transferred by a sender in reversed sequence $Y_N \ldots Y_1$ to a receiver. The decryption device at the receiver obtains the original blocks $X_1 \ldots X_N$ by carrying out a decryption operation by means of a decryption algorithm D and next a XOR operation on each block $Y_N \ldots Y_1$ received to obtain the original blocks $X_1 \ldots X_N$. This system applies the aforementioned Cipher Block Chaining (CBC) to a sequence of blocks in a reversed order relative to the order of the input sequence.

This block cipher mode of operation RCBC Reverse Cipher Block Chaining can be used to achieve Bidirectional Difference Propagation (BDP), when combined with another layer of encryption/decryption. With this method, encryption makes two processing passes over the data, and thus needs to keep the whole sequence of blocks in memory. However, decryption is done in one pass over the data (with two encryption layers), and only two blocks need be kept in memory.

The ciphering method BEAR and LION particularly adapted to large blocks described by Ross J. Anderson and Eli Biham "Two practical and provably secure block ciphers: BEAR and LION" and by Eli Biham, editor, "Fast Software Encryption", 4th International Workshop, FSE '97, Haifa, Israel, Jan. 20-22, 1997, Proceedings, volume 1267 of LNCS. Springer, 1997, pages 113-120 provides BDP by using large, variable-size blocks. However both encryption and decryption need two passes over the data and memory to store the whole sequence of blocks.

Other processes called All-or-nothing-transforms are described by Ran Canetti, Yevgeniy Dodis, Shai Halevi, Eyal Kushilevitz, and Amit Sahai, "Exposure-resilient functions and all-or-nothing transforms"; in Bart Preneel, editor, EUROCRYPT, volume 1807 of LNCS, pages 453-469, Springer, 2000 and by Ronald L. Rivest. "All-or-nothing encryption and the package transform" in Eli Biham, editor, "Fast Software Encryption", 4th International Workshop, FSE'97, Haifa, Israel, Jan. 20-22, 1997, Proceedings, volume 1267 of LNCS. Springer, 1997, pages 210-218.

These processes achieve also BDP. However, the construction according to Ronald L. Rivest "All-or-nothing encryption and the package transform" achieves Bidirectional Difference Propagation (BDP) with respect to decryption rather than encryption, it needs two levels of processing for encryption and decryption, and decryption needs memory for the whole sequence of blocks. Moreover, ciphertexts are longer than plaintexts by one block, and encryption is probabilistic, i.e., it uses an auxiliary pseudorandom generator.

SUMMARY OF THE INVENTION

The present invention aims to provide an efficient solution to the problem of encrypting a plaintext of arbitrary length such that all bits of the ciphertext depend on all bits of the plaintext. Therefore any difference between any two plaintexts makes the two ciphertexts look completely different. This property known as Bidirectional Difference Propagation (BDP) gives a desirable security to encryption methods, as it dissimulates the position of plaintext differences to attackers observing their respective ciphertexts. For example, when encrypting data packets composed of possibly identical headers followed by a variable payload, BDP ensures that the beginning of the ciphertexts will differ.

The aims are achieved by a method and a system adapted for encrypting digital data; said data being divided into a sequence of N blocks of a same length of n bits each, The method comprising steps of:

a) Inputting the sequence of N blocks into a pre-processing module comprising a processor, registers, multiplier modules, addition modules, inverter modules, and a memory containing a set of elements invertible within a predetermined algebraic structure, b) Multiplying, by a multiplier module, each block by an element of the set to obtain a sequence of intermediary blocks, c) Adding, by an addition module, the last intermediary block to the immediately preceding intermediary block to obtain a resulting block, the last intermediary block corresponding to the last resulting block, d) Adding the previously obtained resulting block to the immediately preceding intermediary block to obtain a resulting block, e) Repeating step d) until the step of adding the second resulting block to the first resulting block, said first resulting block being formed by the addition of all intermediary blocks, f) Outputting a sequence of resulting blocks each having a length identical to a corresponding block of the input sequence.

g) Ciphering each resulting blocks, by a ciphering module, with a block cipher in a chaining mode from the first resulting block to the last resulting block with a ciphering algorithm to produce a sequence of ciphered blocks, said ciphered blocks having each a length corresponding to the length of the input bocks.

The method of the invention improves memory and computational efficiency in relation to the methods of the prior art. In fact, the encryption requires executing two processing passes over the plaintext input blocks, one with a linear algebra operation followed by one ciphering layer, requiring memory for the whole sequence of data blocks.

The invention further relates to a system configured to carry out the method.

The decryption requires executing one processing pass over the ciphertext with one layer of decryption and a linear algebra operation computed in pipeline, requiring memory for two blocks.

The produced output ciphertext blocks have the same length as the input plaintext blocks.

The table below shows the differences between the number of encryption/decryption passes and encryption/decryption layers of the prior art solutions and the same of the present solution.

| Solution | Encryption passes | Decryption. passes | Encryption. layers | Decryption. layers |
| --- | --- | --- | --- | --- |
| Folklore | 2 | 2 | 2 | 2 |
| RCBC mode | 2 | 1 | 2 | 2 |
| Large blocks BEAR-LION | 2 | 2 | 1 | 1 |
| All-or-nothing | 2 | 1 | 2 | 2 |
| The present solution | 2 | 1 | 1 | 1 |

BRIEF DESCRIPTION OF THE DRAWINGS

The invention will be better understood with the following detailed description, which refers to the attached figure given as a non-limitative example.

DETAILED DESCRIPTION OF THE INVENTION

The digital data of the plaintext to encrypt are divided into a sequence $(X_1, X_2, X_3 \ldots, X_N)$ of N blocks having each a same length of n bits. In a similar way, ciphertext data $(Z_1, Z_2, Z_3, \ldots, Z_N)$ encrypted by the method of the invention are also divided into N blocks having each a same length of n bits.

In mathematics, each of these blocks is an element of a finite ring $R(+, *)$, i.e. an algebraic structure consisting of a set R together with two binary operations usually called addition (+) and multiplication (*) satisfying at least the known criteria of closure, associativity, and distributivity of multiplication over addition. The ring $R(+, *)$ further comprises an inverse element for both addition and multiplication operations, and each element has a unique additive inverse.

Encryption

In the encryption process the sequence of N plaintext blocks $(X_1, X_2, X_3 \ldots, X_N)$ is entered into a pre-processing module comprising hardware and software modules, such as registers, multipliers, addition modules, inverter modules controlled by a processor. The pre-processing module carries out a first processing pass A by executing successive mathematical operations on the N input blocks sequence $(X_1, X_2, X_3 \ldots X_N)$ and obtains a sequence of resulting blocks $(Y_1, Y_2, Y_3 \ldots Y_N)$. A second processing pass B carries out a ciphering operation using a predetermined algorithm on each resulting blocks $(Y_1, Y_2, Y_3 \ldots Y_N)$ in a chaining mode to produce a sequence of ciphertext blocks $(Z_1, Z_2, Z_3, \ldots Z_N)$.

In a preferred embodiment, the mathematical operations are executed mostly with hardware modules known for their high speed and high reliability calculation performances relative to software program modules.

The pre-processing further comprises a memory containing a set of elements $(m_1, m_2, m_3 \ldots m_N)$ used as coefficients multiplying each block of the input sequence $(X_1, X_2, X_3 \ldots X_N)$. These elements $(m_1, m_2, m_3 \ldots m_N)$ must be invertible within the ring $R(+, *)$, i.e. any input block X can be recovered from any intermediary block X*m, obtained by multiplying the input block X by a coefficient m, by carrying out a multiplication by the multiplicative inverse of m or division by m. In other words m must be different than the null element for the multiplication operation (*) within the predetermined algebraic structure i.e. the ring $R(+, *)$.

Figure 1:
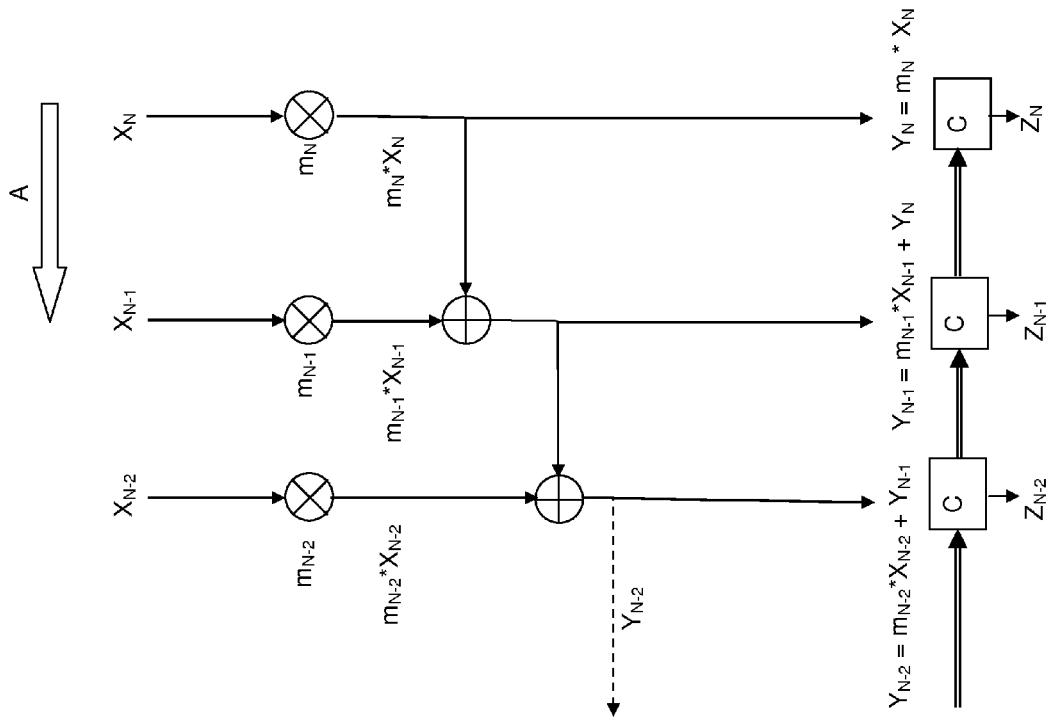
FIG. 1 shows a block diagram of the encryption process where the first pass of pre-processing begins with the last block of the input sequence and ends with the first block. After obtaining a sequence of intermediary blocks, a second pass of ciphering is applied in a chaining mode on each intermediary block from the first to the last block.
Figure 1:
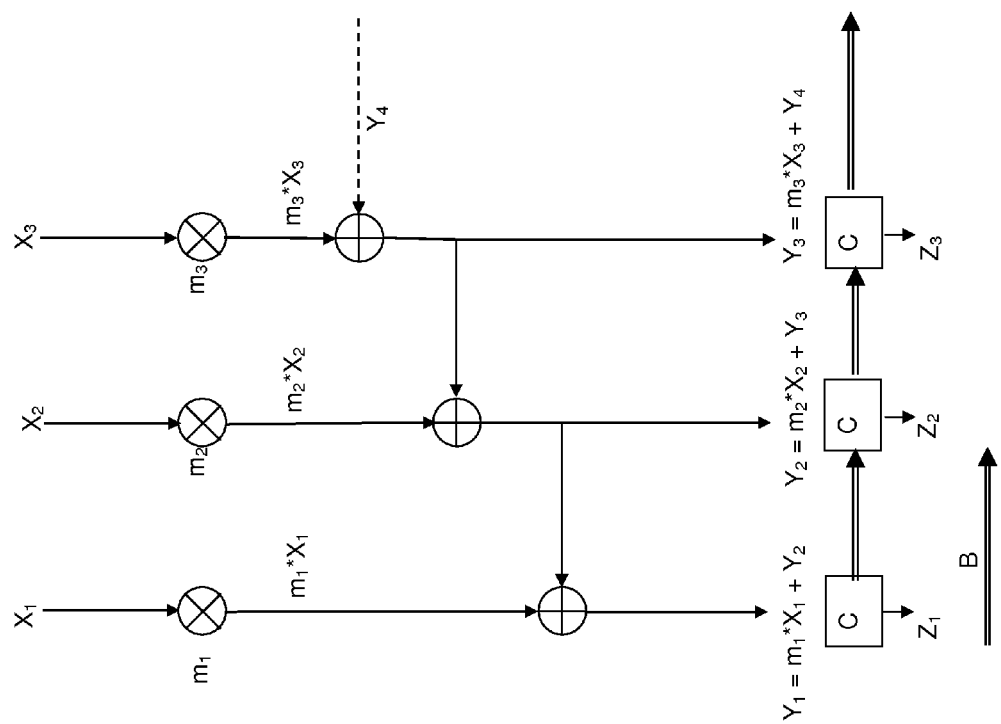

The first processing pass A consisting of executing linear algebraic operation shown by FIG. 1 can be expressed as follow:

The sequence of N blocks of plaintext $(X_1, X_2, X_3 \ldots X_N)$ can be noted as a column vector A. The sequence of the blocks $(Y_1, Y_2, Y_3 \ldots Y_N)$ resulting from the linear algebraic operation can be noted as a column vector B.

The vector B is then obtained by multiplying an upper triangular square matrix M of N×N elements by the vector A. The matrix M is populated row by row in the right upper half, including the diagonal, by N elements $(m_1, m_2, m_3 \ldots m_N)$, the columns containing each the same element. As mentioned above, the N elements $(m_1, m_2, m_3 \ldots m_N)$ belong to the ring $R(+, *)$ and are invertible.

$B = M \times A$ where $$A = \begin{pmatrix} X_1 \\ X_2 \\ X_3 \\ \ldots \\ X_{N-2} \\ X_{N-1} \\ X_{N^*} \end{pmatrix} \quad B = \begin{pmatrix} Y_1 \\ Y_2 \\ Y_3 \\ \ldots \\ Y_{N-2} \\ Y_{N-1} \\ Y_{N^*} \end{pmatrix} \quad \text{and}$$

$$M = \begin{pmatrix} m_1 & m_2 & m_3 & \ldots & m_{N-2} & m_{N-1} & m_N \\ & m_2 & m_3 & \ldots & m_{N-2} & m_{N-1} & m_N \\ & & m_3 & \ldots & m_{N-2} & m_{N-1} & m_N \\ & & & \ldots & m_{N-2} & m_{N-1} & m_N \\ & & & & m_{N-2} & m_{N-1} & m_N \\ & & & & & m_{N-1} & m_N \\ & & & & & & m_N \end{pmatrix}$$

$$M \times A = \begin{pmatrix} m_1 & m_2 & m_3 & \ldots & m_{N-2} & m_{N-1} & m_N \\ & m_2 & m_3 & \ldots & m_{N-2} & m_{N-1} & m_N \\ & & m_3 & \ldots & m_{N-2} & m_{N-1} & m_N \\ & & & \ldots & m_{N-2} & m_{N-1} & m_N \\ & & & & m_{N-2} & m_{N-1} & m_N \\ & & & & & m_{N-1} & m_N \\ & & & & & & m_N \end{pmatrix} \times \begin{pmatrix} X_1 \\ X_2 \\ X_3 \\ \ldots \\ X_{N-2} \\ X_{N-1} \\ X_{N^*} \end{pmatrix}$$

$$= \begin{pmatrix} Y_1 \\ Y_2 \\ Y_3 \\ \ldots \\ Y_{N-2} \\ Y_{N-1} \\ Y_{N^*} \end{pmatrix}$$

$$= B$$

By carrying out the matrix multiplication x, the first resulting Y blocks are $$Y_1 = m_1^* X_1 + \underbrace{m_2^* X_2 + m_3^* X_3 + \ldots + m_{N-2}^* X_{N-2} + m_{N-1}^* X_{N-1} + m_N^* X_N}_{Y_2}$$

or $Y_1 = m_1^* X_1 + Y_2$ $$Y_2 = m_2^* X_2 + \underbrace{m_3^* X_3 + \ldots + m_{N-2}^* X_{N-2} + m_{N-1}^* X_{N-1} + m_N^* X_N}_{Y_3}$$

or $Y_2 = m_2^* X_2 + Y_3$ $$Y_3 = m_3^* X_3 + \underbrace{\ldots + m_{N-2}^* X_{N-2} + m_{N-1}^* X_{N-1} + m_N^* X_N}_{Y_4}$$

or $Y_3 = m_3^* X_3 + Y_4$ and so on for all elements of the matrix M.

The last resulting block will be $Y_N = m_N^* X_N$

In practice, the calculation carried out by the pre-processing module starts by the multiplication of each input plaintext block ($X_1, X_2, X_3 \ldots X_N$) by an element of the set ($m_1, m_2, m_3 \ldots m_N$) stored in the memory. A sequence of intermediary blocks ($X_1^* m_1, X_2^* m_2, X_3^* m_3 \ldots X_N^* m_N$) is thus obtained.

The process continues by beginning with the last intermediary block $X_N^* m_N$ which is already the last resulting block $Y_N = m_N^* X_N$. The arrow A of the FIG. 1 illustrates the direction of the operations.

The further resulting blocks $Y_i$ are obtained by successively adding one by one each intermediary block $X_i^* m_i$ to the result of the preceding additions started from the last intermediary block $X_N^* m_N$. (i being an index going from 1 to N)

These iterative adding steps can be summarized as follow:
1) Set $Y_N = m_N^* X_N$
2) For i=N-1 to 1, set $Y_i = (m_i^* X_i) + Y_{i+1}$ The process ends when the first resulting block $Y_1$ is obtained by the addition of all intermediary blocks ($X_1^* m_1$, $X_2^* m_2, X_3^* m_3 \ldots X_N^* m_N$), i.e. when i=1, $Y_1 = m_1^* X_1 + Y_2$.

The resulting blocks ($Y_1$) $Y_2, Y_3 \ldots Y_N$) having each a length identical to a corresponding block ($X_1, X_2, X_3 \ldots X_N$) of the input sequence are forwarded to a ciphering module C.

In a second processing pass B (arrow B in FIG. 1), each block Y is then ciphered by a ciphering module C in a chaining mode by starting from the first resulting block Y1 to last resulting block $Y_N$, as shown by the arrows linking the ciphering module C represented by FIG. 1. The ciphering algorithm used may be any standard one such as DES, RSA, IDEA, etc. with symmetrical or asymmetrical keys.

Each resulting blocks of the sequence ($Y_1, Y_2, Y_3 \ldots Y_N$) produces a corresponding ciphered blocks sequence ($Z_1, Z_2, Z_3, \ldots Z_N$) having each a same length.

The bidirectional difference propagation effect is thus provided from the last to the first block by the linear algebra operations (first pass A) and from the first to the last block by the ciphering layer (second pass B), once all the resulting blocks ($Y_1, Y_2, Y_3 \ldots Y_N$) are obtained by the first pass A.

Another effect is that each ciphered block ($Z_1, Z_2, Z_3, \ldots Z_{N-1}$) are dependent each other except the last block $Z_N$. An error in any X block will thus affect all ciphered Z blocks produced by the X blocks preceding the erroneous X block. For example if block $X_5$ is corrupted blocks $Y_4, Y_3, Y_2$ and $Y_1$ will be also affected as well as the ciphered blocks $Z_4, Z_3, Z_2, Z_1$. When the last input block $X_N$ is corrupted all blocks will be affected while an error on the first block input $X_1$ will have a minimal effect.

According to an embodiment, the invertible elements ($m_1, m_2, m_3 \ldots m_N$) are all equal to a value corresponding to the multiplicative identity of the predetermined algebraic structure. The sequence of intermediary blocks ($X_1^* m_1, X_2^* m_2, X_3^* m_3 \ldots X_N^* m_N$) is thus equal to the input block sequence ($X_1, X_2, X_3 \ldots X_N$). The matrix M includes only the multiplicative identity at the places of the ($m_1, m_2, m_3, \ldots m_N$) elements.

In this case, the iterative adding steps can be summarized as follow:
1) Set $Y_N = X_N$
2) For i=N-1 to 1, set $Y_i = X_i + Y_{i+1}$ According to a further embodiment the blocks ($X_1, X_2, X_3, \ldots X_N$) and the resulting blocks ($Y_1, \ldots Y_N$) are elements of a finite Gallois ring $GF(2)^n$ (*, +) including binary elements of n bits where multiplication (*) corresponds to logical AND operation and addition (+) corresponds to logical XOR operation carried out bitwise. The invertible elements ($m_1, m_2, m_3 \ldots m_N$) may have any value different than the null element for the logical AND operation within the ring $GF(2)^n$ (AND, XOR). Some elements ($m_1, m_2, m_3 \ldots m_N$) may also be equal to the multiplicative identity.

Figure 2:
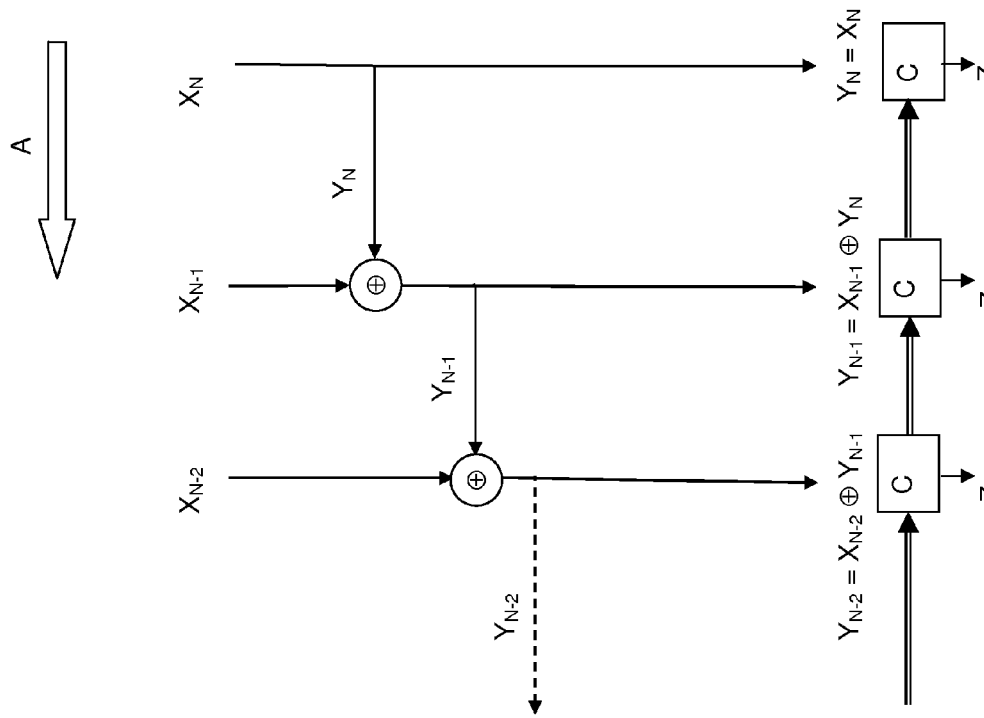
FIG. 2 shows a block diagram of an embodiment of the encryption process shown by FIG. 1 applied in a ring $GF(2)^n$ with logical XOR and AND operations.
Figure 2:
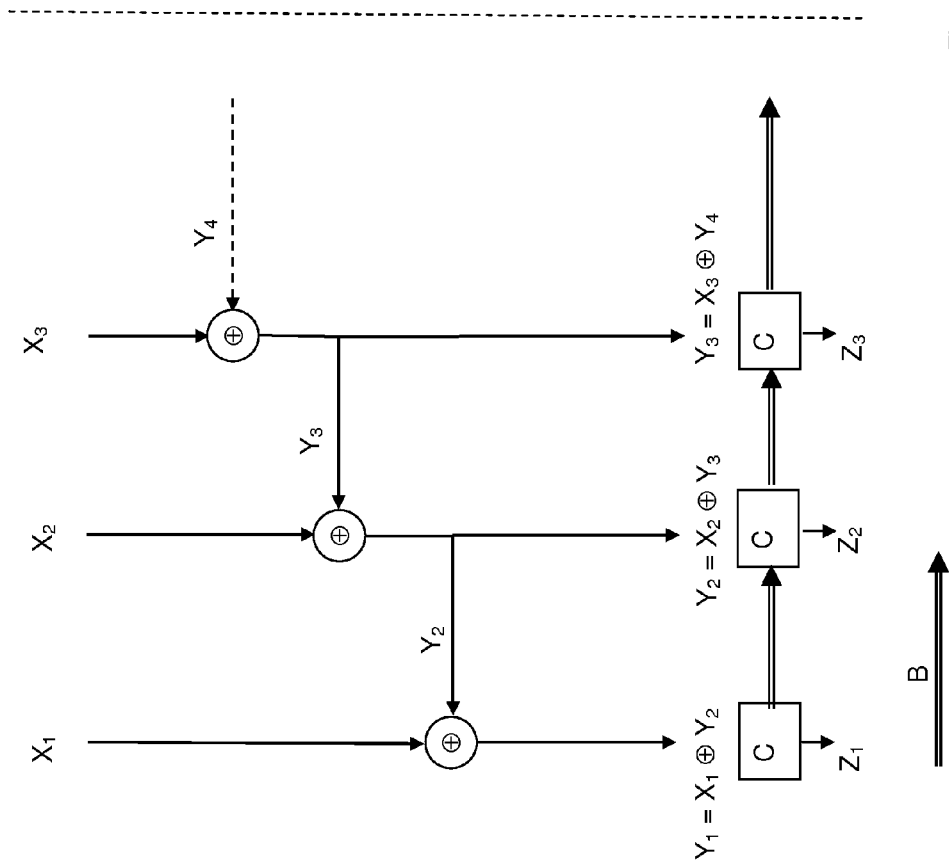

FIG. 2 shows a further embodiment of the encryption process where the invertible elements ($m_1, m_2, m_3, \ldots m_N$) are all equal to a value corresponding to the multiplicative identity i.e. a string of n bit "1" in the ring GF(2)$^n$ (*, +). The multiplication (*) corresponds to logical AND operation and addition (+) corresponds to logical XOR operation carried out bitwise, i.e. the finite ring is defined as GF(2)$^n$ (AND, XOR). Thus an input block (X AND Identity) gives the input block X itself which is set as the intermediary block of the preceding embodiment. Therefore the step of multiplying each input block by an invertible element is suppressed.

The process begins then with the last input block $X_N$ which is set as the last resulting block $Y_N$. The arrow of the FIG. 1 illustrates the direction of the operations.

The further resulting blocks $Y_i$ are obtained by successively "adding" (XOR operation) one by one to each input block $X_i$ to the result of the preceding "additions" (XOR operations) started from the last input block $X_N$. (i being an index going from 1 to N)

These iterative XOR steps can be summarized as follow:
1) Set $Y_N = X_N$
2) For i=N−1 to 1, set $Y_i = X_i \oplus Y_{i+1}$, where $\oplus$ represents logical XOR operation The process ends when the first resulting block $Y_1$ is obtained by the addition of all input blocks $(X_1, X_2, X_3, \ldots X_N)$, i.e. when i=1, $Y_1 = X_1 + Y_2$.

The resulting blocks $(Y_1, Y_2, Y_3 \ldots Y_N)$ having each a length identical to a corresponding input block $(X_1, X_2, X_3 \ldots X_N)$ of the input sequence are forwarded to a ciphering module C.

In a second processing pass B, each block Y is then ciphered by a ciphering module C in a chaining mode by starting from the first resulting block Y1 to last resulting block $Y_N$, as shown by the arrows linking the ciphering module C represented by FIG. 2. The ciphering algorithm used may be any standard one such as DES, RSA, IDEA, etc. with symmetrical or asymmetrical keys.

Each resulting blocks of the sequence $(Y_1, Y_2, Y_3 \ldots Y_N)$ produces a corresponding ciphered blocks sequence $(Z_1, Z_2, Z_3, \ldots, Z_N)$ having each a same length.

Decryption

Figure 3:
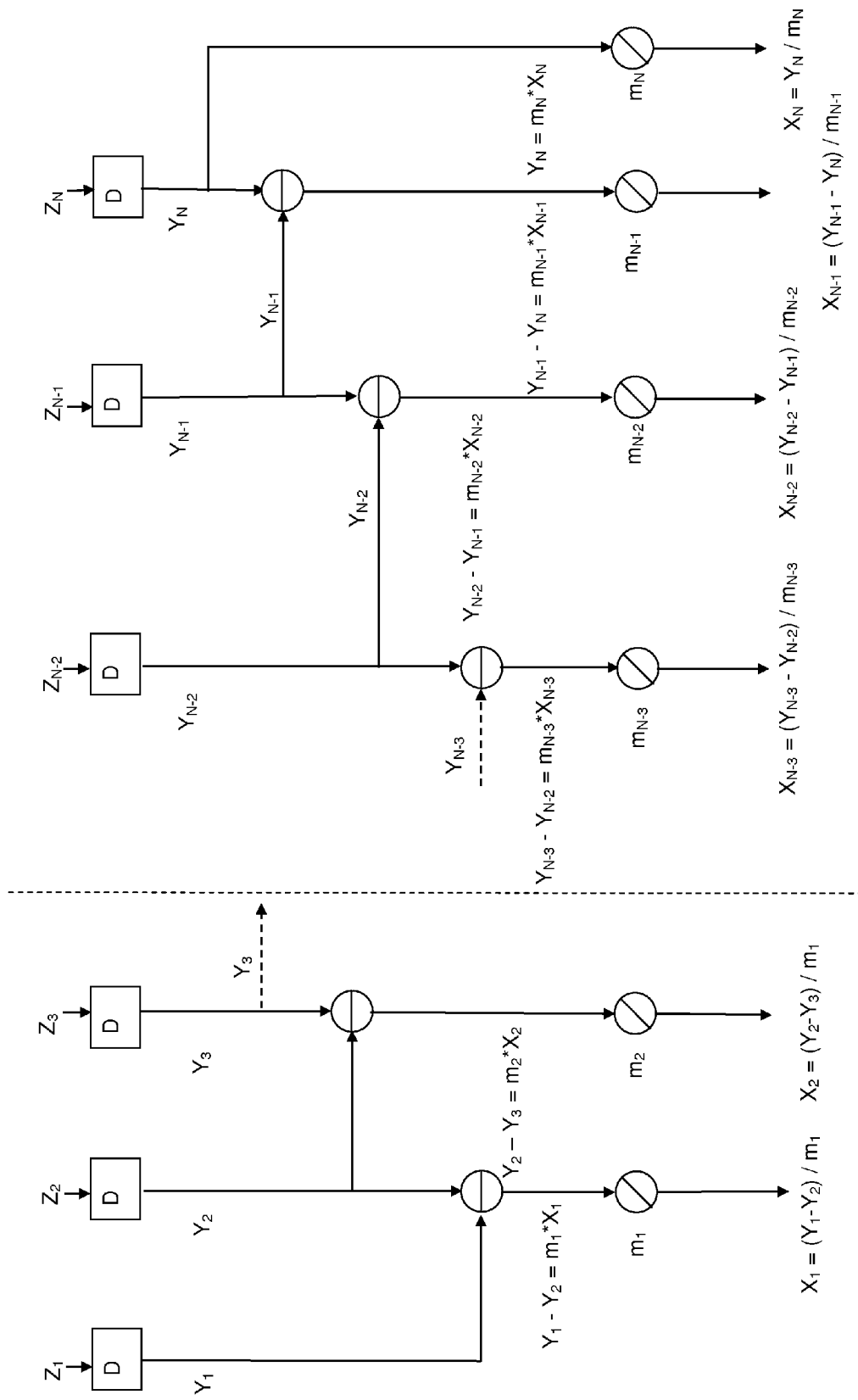
FIG. 3 shows a block diagram of the decryption process of input blocks previously encrypted as shown in FIG. 1. The process begins with the deciphering of the first block and obtaining the following decrypted blocks in one pass by successive deciphering, and inverse algebra operations of the encryption process until obtaining the last decrypted block.

The digital data encrypted according to the above described method are first divided data into a sequence of N encrypted blocks $(Z_1, Z_2, Z_3 \ldots Z_N)$ each of a same length of n bits. The decryption is carried out in one pass A contrarily to the encryption which requires two passes A and B. In FIG. 3, the decryption from input Z block to output X blocks progression is shown by the arrow A directed from left to the right. A deciphering module D deciphers the two first input encrypted blocks $Z_1$ and $Z_2$ by using a deciphering algorithm corresponding to the algorithm used for ciphering and obtains two first deciphered intermediate resulting blocks $Y_1$ and $Y_2$ which are stored into a buffer or a register.

The first deciphered intermediate resulting block $Y_1$ is then input into the pre-processing module for calculating by the addition, multiplier and inverter modules, a first decrypted resulting block $X_1 = (Y_1 - Y_2)/m_1$. The second intermediate deciphered resulting block $Y_2$ is subtracted to the first deciphered intermediate resulting block $Y_1$ and the result of the subtraction is divided by the first element $m_1$ of the set $(m_1, m_2, m_3 \ldots m_N)$ stored in the memory of the pre-processing module.

In the ring R(*, +), the subtraction corresponds to an addition of the additive inverse of the block Y and the division corresponds to the multiplication of the multiplicative inverse of the element m which is invertible.

The process continues by deciphering each following ciphered block $Z_3, Z_4, \ldots Z_N$, and calculating successively, after obtaining each intermediate deciphered resulting block $Y_3, Y_4, \ldots Y_N$, each decrypted resulting block $X_3 X_4, \ldots X_N$ by subtracting to an intermediate deciphered resulting block $Y_i$ obtained, the immediately following intermediate deciphered resulting block $Y_{i+1}$ and dividing the result of the subtraction by an element $m_i$, where i is an index going from 1 to N.

At the end of the process, the penultimate decrypted resulting block $X_{N-1} = (Y_{N-1} - Y_N)/m_{N-1}$ is obtained by subtracting to the penultimate intermediate deciphered resulting block $Y_{N-1}$ the last intermediate deciphered resulting block $Y_N$ and by dividing the result of the subtraction by the penultimate element $m_{N-1}$ of the set $(m_1, m_2, m_3 \ldots m_N)$. The last intermediate deciphered resulting block $Y_N$ is then divided by the last element $m_N$ to obtain the last decrypted resulting block $X_N$.

The decryption processing pass can be summarized as follow:
1) Decipher $Z_1$ to obtain $Y_1$,
2) For i=1 to N−1
   Decipher the block $Z_{i+1}$ to obtain $Y_{i+1}$,
   Set $X_i = (Y_i - Y_{i+1})/m_i$
3) Set $X_N = Y_N/m_N$ In the embodiment where the invertible elements $(m_1, m_2, m_3 \ldots m_N)$ are all equal to a value corresponding to the multiplicative identity of the predetermined algebraic structure, the decryption process will be simplified as follow:
1) Decipher $Z_1$ to obtain $Y_1$,
2) For i=1 to N−1
   Decipher the block $Z_{i+1}$ to obtain $Y_{i+1}$,
   Set $X_i = Y_i - Y_{i+1}$
3) Set $X_N = Y_N$ According to a further embodiment the decrypted resulting block $(X_1, X_2, X_3, \ldots X_N)$ and the intermediate deciphered resulting blocks $(Y_1, \ldots Y_N)$ are elements of a finite Gallois ring GF(2)$^n$ (*, +) including binary elements of n bits where multiplication (*) corresponds to logical AND operation and addition (+) corresponds to logical XOR operation carried out bitwise. The invertible elements $(m_1, m_2, m_3 \ldots m_N)$ may have any value different than the null element for the logical AND operation within the ring GF(2)$^n$ (AND, XOR). Some elements $(m_1, m_2, m_3 \ldots m_N)$ may also be equal to the multiplicative identity.

Figure 4:
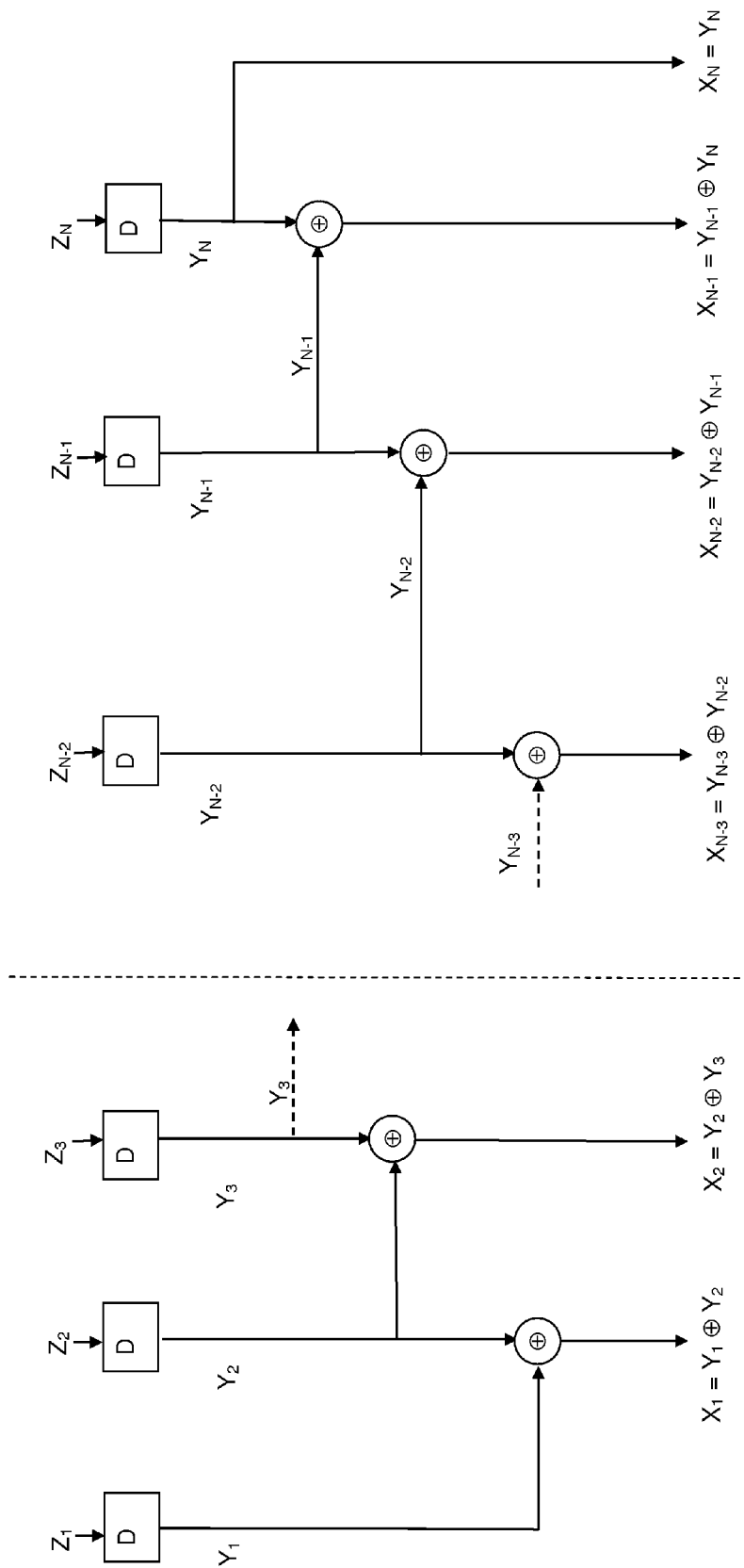
FIG. 4 shows a block diagram of the decryption process applied in a ring $GF(2)^n$ with logical XOR and AND operations to blocks encrypted according to process shown by FIG. 2.

FIG. 4 shows the embodiment of the decryption process where the invertible elements $(m_1, m_2, m_3 \ldots m_N)$ are all equal to a value corresponding to the multiplicative identity. The multiplication (*) corresponds to logical AND operation and addition (+) corresponds to logical XOR operation carried out bitwise.

The process begins then with the first and second input block $Z_1 Z_2$ which are deciphered to obtain the corresponding first and the second intermediary resulting blocks $Y_1$ and $Y_2$.

The further resulting blocks $Y_i$ are obtained by successively deciphering and "adding" (XOR operation) two consecutive intermediate resulting blocks $Y_i, Y_{i+1}$ after each deciphering of an input encrypted block $Z_i$.

In the ring GF(2)$^n$ (AND, XOR), calculations are particularly simplified thanks to XOR operation which is involutive, i.e. the inverse of the XOR operation is XOR operation itself, and also commutative $(Y_1 \text{ XOR } Y_2) = (Y_2 \text{ XOR } Y_1)$.

The iterative deciphering and XOR steps can be summarized as follow:
1) Decipher $Z_1$ to obtain $Y_1$,
2) For i=1 to N−1
   Decipher the block $Z_{i+1}$ to obtain $Y_{i+1}$,
   Set $X_i = Y_i \oplus Y_{i+1}$ where $\oplus$ represents XOR operation
3) Set $X_N = Y_N$ Unlike the encryption process where the algebraic operation and the ciphering operations are executed in two separate passes, the decryption process executes, in only one pass, deciphering for obtaining one after the other an immediately following intermediate deciphered resulting block $Y_{i+1}$ to subtract from the intermediate deciphered resulting block $Y_i$ obtained just before. In other words input encrypted block $Z_i$ deciphering operation is included in the algebraic iterative additions loop of consecutive intermediary resulting blocks $Y_i$ with the index i progressing from 1 to N−1.

In an analogous way of the encryption, each encrypted block $(Z_1, Z_2, Z_3, \ldots Z_{N-1})$ are dependent each other except the last block $Z_N$. An error in any Z block will thus affect all decrypted X blocks produced by the Z blocks following the erroneous Z block. For example if block $Z_3$ is corrupted deciphered intermediate blocks $Y_4, Y_5, \ldots$ until the penultimate block $Y_{N-1}$ will be also affected as well as the corresponding decrypted output blocks $X_4, X_5, \ldots, X_{N-1}$. When the first input block $Z_1$ is corrupted all blocks will be affected while an error on the last input block $Z_N$ will have a minimal effect.

The invention claimed is:

1. A method for encrypting digital data, said data being divided into a sequence of N first blocks of a same length of n bits each, N being an integer greater than 1, n being an integer greater than 1, comprising steps of:
   inputting the sequence of N first blocks into a pre-processing module comprising a processor, registers, an arithmetic module, and a memory containing a set including N invertible elements, the N first blocks and the N invertible elements being within a predetermined finite ring, the arithmetic module including multiplier modules, addition modules and inverter modules, and
   using the arithmetic module to determine N resulting blocks based on the N first blocks and the N invertible elements by executing resulting block determination operations including,
   i) set $Y_N = M_N * X_N$, and
   ii) for i=N−1 to 1, set $Y_i = (m_i * X_i) + Y_{i+1}$,
   where 'i' is an index, $Y_1$-$Y_N$ are the N resulting blocks, respectively, $m_1$-$m_N$ are the N invertible elements, respectively, and $X_1$-$X_N$ are the N first blocks, respectively,
   outputting a sequence of the N resulting blocks, each of the N resulting blocks having a length identical to a corresponding block of the input sequence of N first blocks, and
   ciphering each of the sequence of the N resulting blocks, by a ciphering module, with a block cipher in a chaining mode from the first block of the sequence of the N resulting blocks to the last block of the sequence of the N resulting blocks with a ciphering algorithm to produce a sequence of N encrypted blocks, said encrypted blocks having each a same length.

2. The method according to claim 1 wherein the N invertible elements of the set are all equal to a value corresponding to the multiplicative identity of the predetermined finite ring.

3. The method according to claim 2, wherein the N first blocks of the input sequence and the N resulting blocks are elements of a finite Gallois ring including binary elements of n bits where multiplication corresponds to logical AND operation and addition corresponds to logical XOR operation carried out bitwise.

4. The method according to claim 2 wherein the N invertible elements of the set are all equal to a value corresponding to the multiplicative identity of the predetermined finite ring, wherein the N first blocks and the N resulting blocks are elements of a finite Gallois ring including binary elements of n bits where multiplication corresponds to a logical AND operation and addition corresponds to a logical XOR operation carried out bitwise, and wherein operation ii) of the resulting block determination operations is expressed as,
   ii) for i=N−1 to 1, set $Y_i = X_i \oplus Y_{i+1}$,
   where $\oplus$ represents the logical XOR operation.

5. The method for decrypting digital data encrypted according to the method of claim 1, said data being the sequence of N encrypted blocks, comprising:
   using a deciphering module and the arithmetic module to execute resulting block decryption operations including,
   i) deciphering, by a deciphering module, a block $Z_1$ with a deciphering algorithm to obtain the block $Y_1$,
   ii) for i=1 to N−1, deciphering a block $Z_{j+1}$ to obtain $Y_{j+1}$, and set $X_j = Y_j - Y_{j+1}$, and
   iii) setting $X_j = (Y_j - Y_{j+1})/m_j$,
   where 'j' is an index, and $Z_1$-$Z_N$ are the N encrypted blocks, respectively, $Y_1$-$Y_N$ are N deciphered intermediate blocks, respectively, and $X_1$-$X_N$ are N decrypted blocks, respectively, the N deciphered intermediate blocks being the N resulting blocks after ciphering and deciphering, the N decrypted blocks being the N first blocks after encryption and decryption, and
   outputting, as a sequence of N decrypted resulting blocks, the blocks $X_1$-$X_N$, said N decrypted resulting blocks having each a same length.

6. The method according to claim 5 wherein the N invertible elements of the set are all equal to a value corresponding to the multiplicative identity of the predetermined finite ring.

7. The method according to claim 6, wherein the N decrypted blocks and the N deciphered intermediate blocks are elements of a finite Gallois ring including binary elements of n bits where multiplication corresponds to logical AND operation and addition corresponds to logical XOR operation carried out bitwise.

8. The method according to claim 6, wherein the N invertible elements are all equal to a value corresponding to the multiplicative identity of the predetermined finite ring and wherein the N decrypted blocks and the N deciphered intermediate blocks are elements of a finite Gallois ring including binary elements of n bits where multiplication corresponds to logical AND operation and addition corresponds to logical XOR operation carried out bitwise, and
   wherein operation ii) of the resulting block decryption operations is expressed as,
   ii) for j=1 to N−1, decipher the block $Z_{j+1}$ to obtain $Y_{j+1}$, and set $X_j = Y_j \oplus Y_{j+1}$, where $\oplus$ represents XOR operation.

9. A system configured to encrypt digital data, said data being divided into a sequence of N first blocks of a same length of n bits each, N being an integer greater than 1, n being an integer greater than 1, comprising:
   a) a pre-processing module comprising a processor, registers, an arithmetic module, and a memory containing a set including N invertible elements, the N first blocks and the N invertible elements being within a predetermined finite ring, the arithmetic module including multiplier modules, addition modules and inverter modules, the pre-processing module being adapted to receive the sequence of N blocks at an input, the arithmetic module being configured to determine N resulting blocks based on the N first blocks and the N invertible elements by executing the following resulting block determination operations,
   i) set $Y_N = m_N * X_N$, and
   ii) for i=N−1 to 1, set $Y_i = (m_i * X_i) + Y_{i+1}$, wherein 'i' is an index, $Y_1$-$Y_N$ are the N resulting blocks, respectively, $m_1$-$m_N$ are the N invertible elements, respectively, and $X_1$-$X_N$ are the N first blocks, respectively, and wherein the pre-processing module is configured to output a sequence of the N resulting blocks, each of the N resulting blocks having a length identical to a corresponding block of the input sequence of N first blocks; and b) a ciphering module configured to cipher each of the sequence of the N resulting blocks with a block cipher in a chaining mode from the first block of the sequence of the N resulting blocks to the last block of the sequence of the N resulting blocks with a ciphering algorithm and to produce a sequence of N encrypted blocks, said encrypted blocks having each a same length.

10. The system according to claim 9 wherein the N invertible elements of the set are all equal to a value corresponding to the multiplicative identity of the predetermined finite ring.

11. The system according to claim 10, wherein the N first blocks of the input sequence and the N resulting blocks are elements of a finite Gallois ring including binary elements of n bits where multiplication corresponds to logical AND operation and addition corresponds to logical XOR operation carried out bitwise.

12. The system according to claim 10 wherein the N invertible elements of the set are all equal to a value corresponding to the multiplicative identity of the predetermined finite ring, wherein the N first blocks and the N resulting blocks are elements of a finite Gallois ring including binary elements of n bits where multiplication corresponds to logical AND operation and addition corresponds to logical XOR operation carried out bitwise, and wherein operation ii) of the resulting block determination operations is expressed as, ii) for i=N−1 to 1, set $Y_i = X_i \oplus Y_{i+1}$, where $\oplus$ represents the logical XOR operation.

13. The system configured for decrypting digital data encrypted by the system according to claim 9, said data being the sequence of N encrypted blocks, comprising:

a deciphering module, the deciphering module and the arithmetic module being configured such that the deciphering module and the arithmetic module execute resulting block decryption operations including, i) deciphering a block $Z_1$ with a deciphering algorithm to obtain the block $Y_1$, ii) for j=1 to N−1, deciphering a block $Z_{j+1}$ to obtain $Y_{j+1}$, and set $X_j = X_j - Y_{j+1}$, and iii) setting $X_j = (Y_j - Y_{j+1})/m_j$, where 'j' is an index, and $Z_1$-$Z_N$ are the N encrypted blocks, respectively, $Y_1$-$Y_N$ are N deciphered intermediate blocks, respectively, and $X_1$-$X_N$ are N decrypted blocks, respectively, the N deciphered intermediate blocks being the N resulting blocks after ciphering and deciphering, the N decrypted blocks being the N first blocks after encryption and decryption, and the pre-processing module being configured to output, as a sequence of N decrypted resulting blocks, the blocks $X_1$-$X_N$, said N decrypted resulting blocks having each a same length.

14. The system according to claim 13 wherein the N invertible elements of the set are all equal to a value corresponding to the multiplicative identity of the predetermined finite ring.

15. The system according to claim 14, wherein the N decrypted resulting blocks and the N deciphered intermediate resulting blocks are elements of a finite Gallois ring including binary elements of n bits where multiplication corresponds to logical AND operation and addition corresponds to logical XOR operation carried out bitwise.

16. The system according to claim 14, wherein the N invertible elements are all equal to a value corresponding to the multiplicative identity of the predetermined finite ring and wherein the N decrypted blocks and the N deciphered intermediate blocks are elements of a finite Gallois ring including binary elements of n bits where multiplication correspond to logical AND operation and addition correspond to logical XOR operation carried out bitwise, and wherein operation ii) of the resulting block decryption operations is expressed as, ii) for j=1 to N−1, decipher the block $Z_{j+1}$ to obtain $Y_{j+1}$, and set $X_j = Y_j \oplus Y_{j+1}$, where $\oplus$ represents XOR operation.

* * * * *